United States Patent [19]

Serro

[11] Patent Number: 5,363,803
[45] Date of Patent: Nov. 15, 1994

[54] PERSONAL BIRD PERCH

[76] Inventor: Tony Serro, P.O. Box 2592, Telluride, Colo. 81435

[21] Appl. No.: 126,483

[22] Filed: Sep. 24, 1993

[51] Int. Cl.⁵ .............................................. A01K 31/12
[52] U.S. Cl. ................................................... 119/26
[58] Field of Search ........................ 119/26; 2/46, 94

[56] References Cited

U.S. PATENT DOCUMENTS

| | | | |
|---|---|---|---|
| 2,499,689 | 3/1950 | Sossamon | 2/46 X |
| 2,831,193 | 4/1958 | Terry | 2/46 |
| 4,807,568 | 2/1989 | Perry et al. | 119/26 |
| 4,919,081 | 4/1990 | Lewellen | 119/26 |

Primary Examiner—Robert P. Swiatek
Attorney, Agent, or Firm—Joseph T. Regard

[57] ABSTRACT

A portable bird perch designed for carrying and displaying pet birds, from a Parakeet to a Peacock, on the shoulder of the user, in an easily adjusted, and thereby comfortable manner, both for the bird and the user. The preferred embodiment of the present invention teaches a radially curved support base, designed for riding upon the shoulder of the user, and configured to be affixed to the user via adjustable straps passed about the underarms of the user. The base has an upper surface including a support perch for the animal in the form a grid template, and further includes a waste receptacle situated under the tail area of the bird to be supported. The exemplary embodiment of the present invention is contemplated for use in conjunction with a parrot or like sized and weighted bird, although the present invention may be configured for use with a variety, and, with smaller varieties, a plurality of birds. The present invention further provides a bird support/transport system which greatly enhances the relationship between the pet and its owner, as it allows the unencumbered carrying of the bird, to the full enjoyment of both the bird and user.

9 Claims, 3 Drawing Sheets

PERSONAL BIRD PERCH

BACKGROUND OF THE INVENTION

Invention Field

The present invention relates to bird perches, and in particular to a portable bird perch designed for carrying and displaying pet birds, from a Parakeet to a Peacock, on the shoulder of the user, in an easily adjusted, and thereby comfortable manner, both for the bird and the user.

The preferred embodiment of the present invention teaches a radially curved support base, designed for riding upon the shoulder of the user, and configured to be affixed to the user via adjustable straps passed about the underarms of the user. The base has an upper surface including a support perch for the animal in the form a grid template, and further includes a waste receptacle situated under the tail area of the bird to be supported.

The exemplary embodiment of the present invention is contemplated for use in conjunction with a parrot or like sized and weighted bird, although the present invention may be configured for use with a variety, and, with smaller varieties, a plurality of birds.

The present invention further provides a bird support/transport system which greatly enhances the relationship between the pet and its owner, as it allows the unencumbered carrying of the bird, to the full enjoyment of both the bird and user.

General Background Discussion

While birds have been made pets to humans for all of written history, the inventor knows of no particular perch designs which allow for the comfortable support of birds upon the wearer in a safe, comfortable, and sanitary manner.

Of course, it is known that bird owners have and do carry birds upon their shoulders, this method is usually regarded with some distaste and discomfort, as the animal unintentionally will excrete wastes upon the party supporting it. Further, the claws of the bird may not only be uncomfortable to bear, especially with the heavier species, but also may damage clothing.

However, bird owners have, until now, had little choice as to how their birds were to be conveyed on walks or the like. Bird gloves do not provide a practical means of carrying or supporting a pet bird for an extended period of time, nor does it provide an enjoyable interface between the pet and its master.

Consequently, there has existed for some time a need for a portable, personal bird support system which comfortably and in a sanitary and safe fashion supports a pet bird in such a manner as to provide an enjoyable interface between the pet and its owner.

SUMMARY DISCUSSION OF THE INVENTION

The present invention was conceived and created by the inventor to enhance the relationship between a domestic bird/pet and its owner, and provide flexibility and convenience in conveying the bird. The purpose of the invention is to stimulate the animal in an environment other than its own dwelling, by allowing the owner to support the animal atop its owner's shoulder during a variety of activities.

The present invention is configured such that the animal can grip its claws through a novel raised grid support area, in a secure and relatively comfortable fashion. Further, the present invention provides a waste receptacle configured for placement under the tail of the animal during use, eliminating droppings from falling upon the user's back.

The exemplary embodiment of the present invention teaches the utilization of first and second, adjustable elastic support bands, each separately threaded under the grid support area, the first and second band placed about each of the user's underarms, respectively, for securing the portable perch in place. Additionally, the straps are configured to stabilize the perch area by securing it well upon the user's shoulder. The straps may be provided with adjustment rings, VELCRO, or the like as desired for further flexibility.

The present invention may be formed of plastic or other lightweight, yet relatively rigid, strong, and easily cleaned, sanitary material. It has been found that the plastic embodiment is dishwasher safe and thereby easily cleaned.

It is therefore an object to provide a portable bird perch system which may be affixed to the user in a comfortable and secure manner.

It is another object of the present invention to provide a portable bird perch system which safely, effectively, and in a sanitary fashion can support a variety of size birds and the like upon the shoulder of the user.

It is still another object of the present invention to provide a portable bird perch which is adjustable to accommodate various size users.

Lastly, it is an object of the present invention to provide a portable bird perch which is easily cleaned and implemented.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
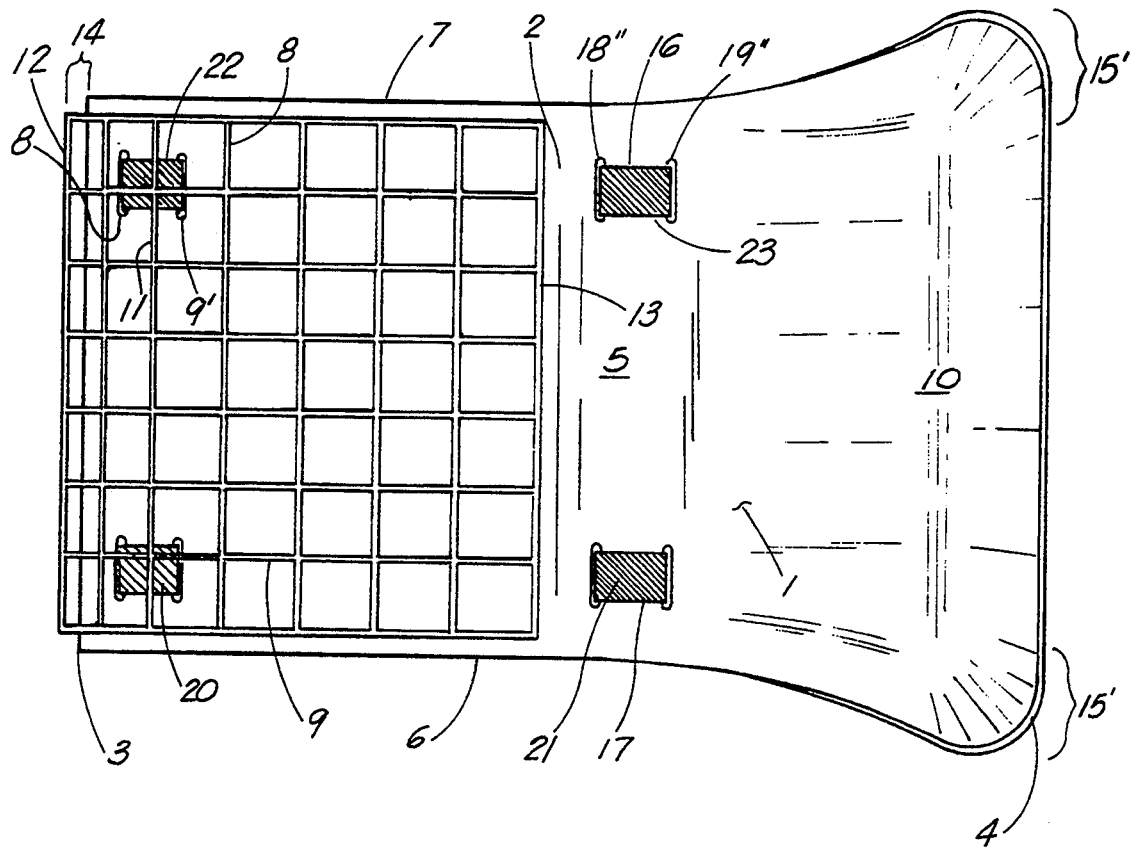
FIG. 1 is a top view of the personal bird perch of the present invention, illustrating the main body, the grid area, and the receptacle basin, as well as the straps and their interface with the main body.

As can be seen in FIG. 1, the personal bird perch 1 of the present invention, comprises a main base 2 of plastic or the like, having forward 3 and rear 4 ends, a top face 5, and first 6 and second 7 side edges.

Situated on the top face 5 of the base 2 is a grid perch piece 8, comprising longitudinal 9 and lateral 11 slats. As shown, the forward end 12 of the perch grid may overhang a small amount 14 over the forward end 3 of the main base 2.

The rear end 4 of the perch has formed therein a catch basin 10 for catching the waste of a bird perched thereon. The catch basin may be slightly wider 15', 15" than the grid perch piece 8, to effectively catch the waste from the vicinity of the base of the tail of the bird. The rear end 13 of the perch grid should be situated between the basin 10 and the forward end 3 on the main base 2, so as to generally keep the base of the perched bird's tail under the catch basin 10.

As shown, the perch of the present invention also includes first 16 and second 17 straps, generally near and aligned with the second 7 and first 6 sides of the main base, respectively. The first 16 and second 17 straps respectively pass through forward 22, 20 and rear 23, 21 strap interface loops, respectively, each of the forward and rear strap loops comprising first 18', 18" and second 19', 19" cuts formed in the main base 2.

Figure 2:
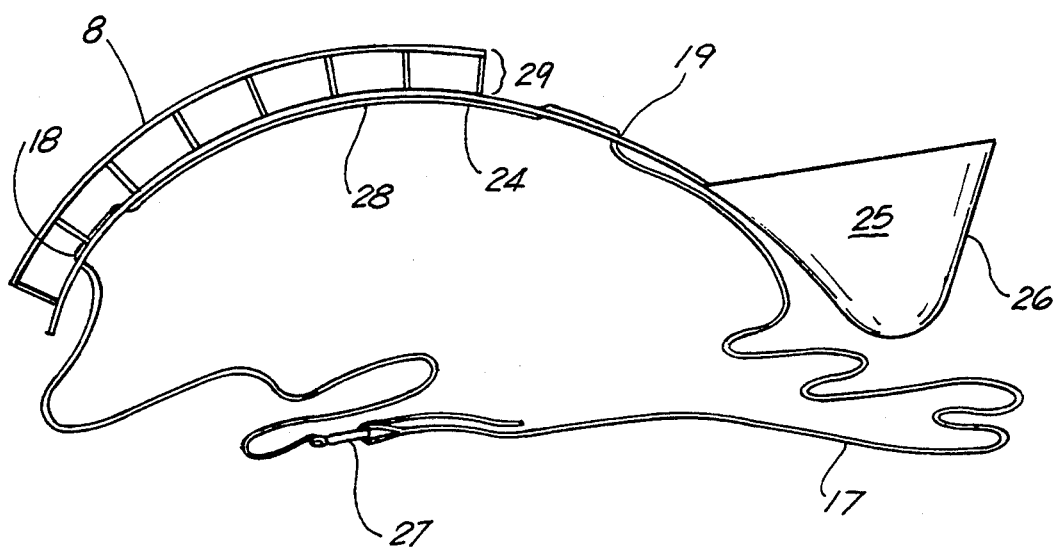
FIG. 2 is a side view of the personal bird perch of the invention of FIG. 1, illustrating the radial curve of the main body, as well as the configuration of the receptacle basin.

FIG. 2 illustrates a side view of the present invention, illustrating the radial configuration of the underside 24 of the main base, so as to straddle the shoulder of the user, as will be more fully illustrated infra. Also illustrated is the height 29 of the grid 8, which may be, for example, 1/32 to 1/4 of an inch, and configured such that the bird is stably perched thereon.

Further referring to FIG. 2, the basin of the present invention includes side walls 25 and a back wall 26 for catching and holding waste from the perched bird.

Relative to the straps of the invention, each strap 17 may be adjusted via loop 27, VELCRO, buckle, or the like, and is configured to run 28 along the underside 24 of the main base, between the front and rear strap interface loops.

Figure 3:
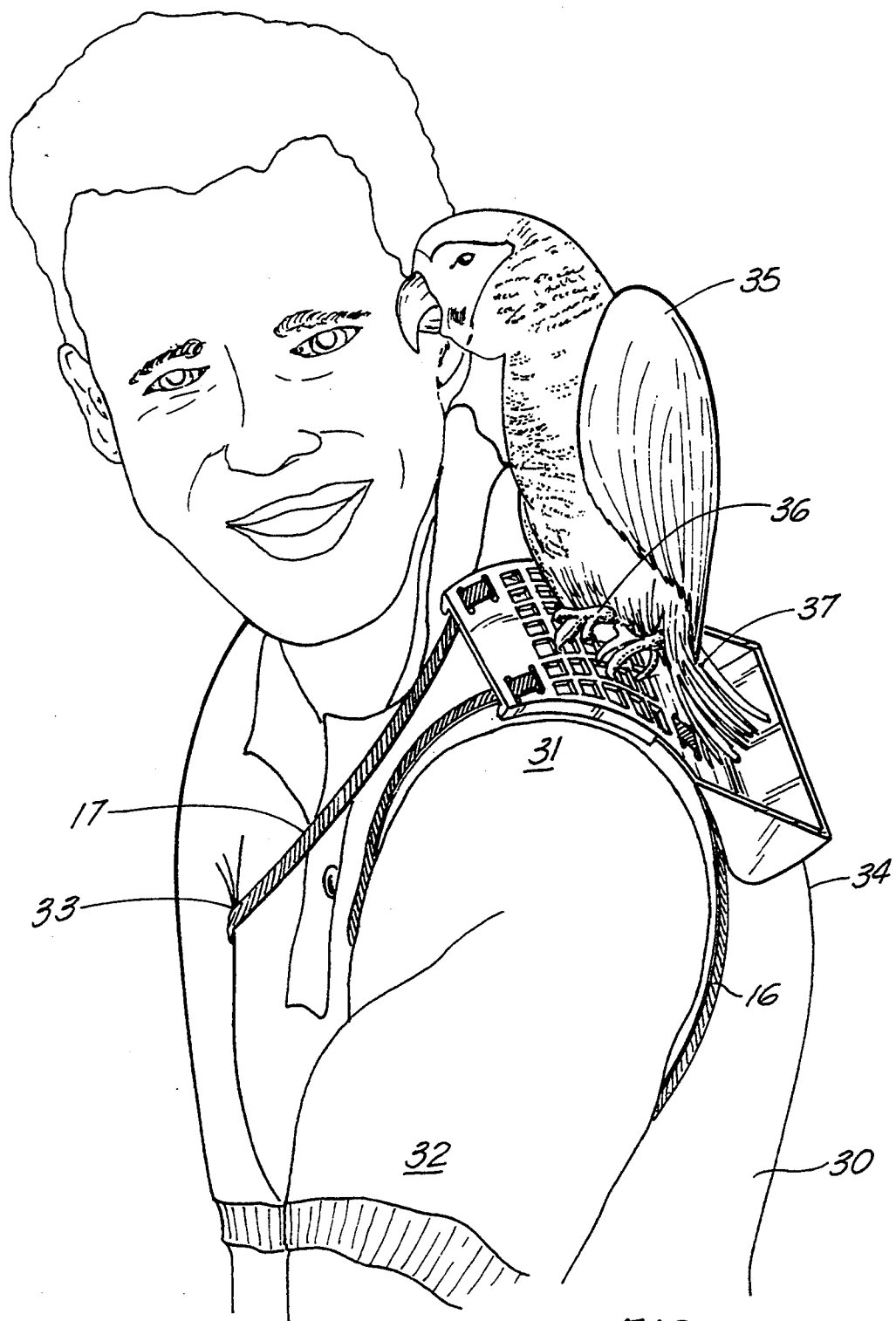
FIG. 3 is an isometric view of the personal bird perch of the invention of FIG. 1, illustrating the present invention as installed upon the shoulder of the user, further illustrating the placement of an exemplary bird thereon.

As shown in FIG. 3, the user places the personal bird perch of the present invention such that the radial underside rides upon his/her shoulder 31, with the catch basin or rear end of the perch riding over the back 34 of said user. The first strap 16 is then placed under the arm 32 of the shoulder supporting the perch, while the second strap 17 is placed under the other underarm 33, running around the back of the user to the join the other end of said strap. The straps are adjusted so as to firmly but comfortably maintain the perch atop the user's shoulder.

The bird 35 is placed upon the grid of the perch, the birds claws 36 gripping the lateral and longitudinal slats forming the grid in order to support the bird comfortably. The perch is configured such that the catch basin is generally under the base of the tail 37 of the bird.

Figure 4:
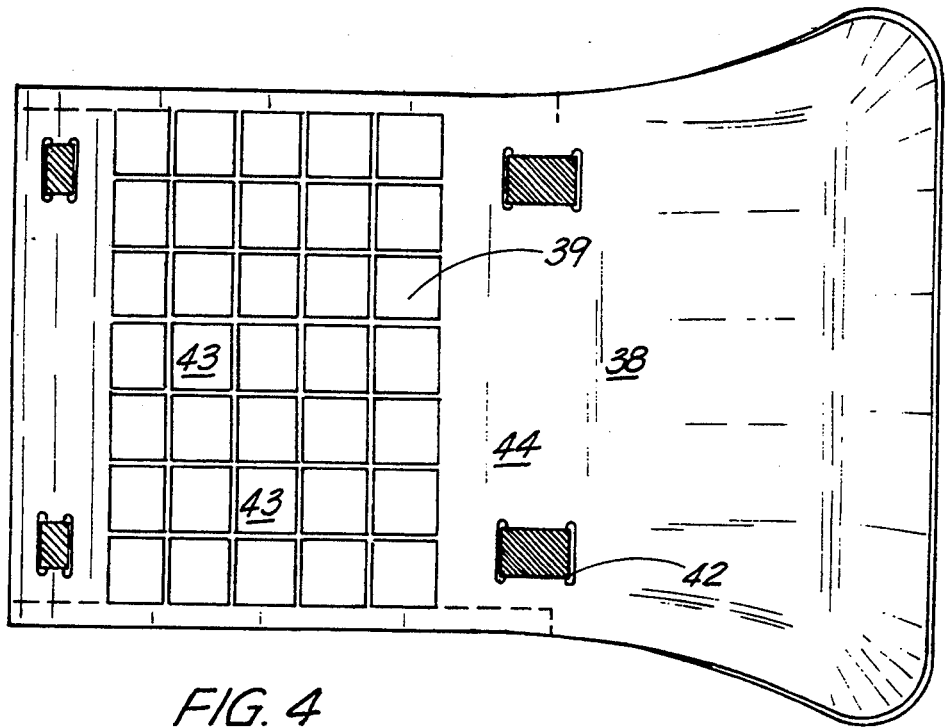
FIG. 4 is a top view of an alternative embodiment of the personal bird perch of the present invention, illustrating an alternative base member wherein the grid is molded therein.
Figure 5:
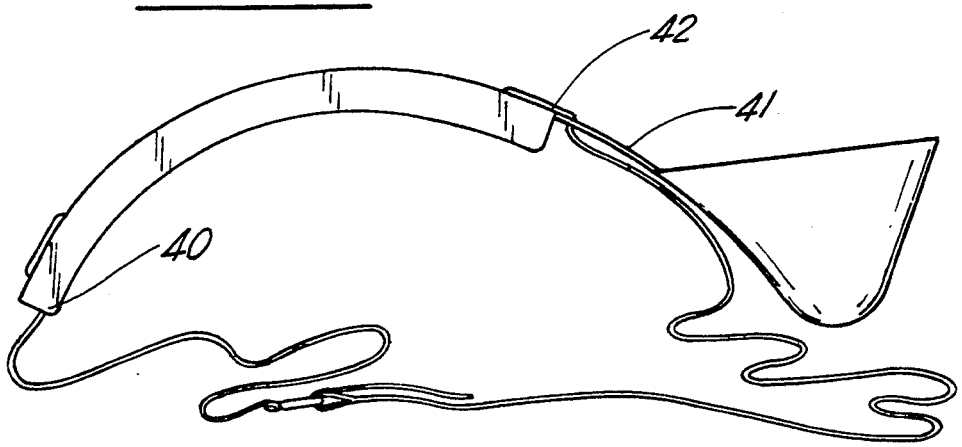
FIG. 5 is a side view of the alternative embodiment of the personal bird perch of FIG. 4, illustrating the radial spacer member implemented with the alternative embodiment.
Figure 6:
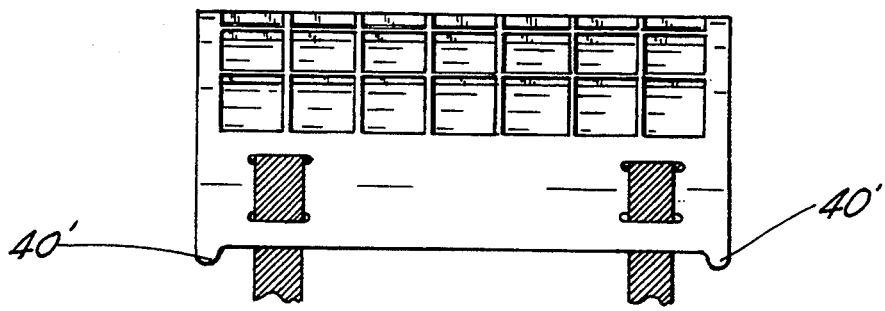
FIG. 6 is a front end view of the alternative embodiment of the personal bird perch of FIG. 4, illustrating the radial spacer members implemented with the present alternative embodiment, and their placement on the side edges of the lower portion of the base member.

FIGS. 4, 5, and 6 illustrate an alternative embodiment 38 of the present invention, wherein there is provided a grid perch area 39 molded into the main base, as opposed to the separate grid piece taught in the preferred embodiment, supra. As shown, the grid is formed of square depressions 43 formed in the top face of the base member 44, about, for example, 1/32-1/4 of an inch deep.

FIGS. 5 and 6 illustrate another feature of an alternative embodiment of the present invention, comprising spacing members 40, 40' formed along the lower side edges of the base member, anywhere from, for example, 1/32-1/2 of an inch down from the underside of the base member. As shown, the spacing members run, for example, from the front end of the perch to about the rear strap interface loop 42.

In addition to the grid perch area comprising a grid formed of vertical and/or longitudinal slats, the perch area may also be formed of a variety of friction surfaces, such as urethane foam, latex, or the like, as its purpose is merely to provide the perched bird with a gripping surface.

The present invention may be provided in a variety of sizes, depending upon the size of the bird to be supported, and in some instances, the size of the user/owner. The grid perch piece should be configured to rest atop the shoulder area, with the catch basin under the base of the tail of the bird, and the base member should have a radial underside to generally ride comfortably atop the shoulder of the user.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A personal bird perch for supporting a bird upon the shoulder of the user, comprising:
   a main base having a forward end, a rear end, a top face, a bottom face, and first and second side edges, said main base having a generally radially configured bottom face;
   a catch basin situated at or near the rear end of said main base;
   a grid perch area situated on said top face of said main base, said grid perch area comprising a plurality of generally aligned lateral slats at least 1/32 inch height.

2. The personal bird perch of claim 1, wherein the grid perch area further comprises a plurality of generally aligned longitudinal slats intersecting said lateral slats.

3. The personal bird perch of claim 1, wherein said catch basin is wider than said grid perch area.

4. The personal bird perch of claim 1, wherein there is provided first and second spacer members emanating from said underside of said main base, along said side edges of said main base, in generally radial fashion.

5. The personal bird perch of claim 1, wherein there is further provided a first strap configured to communicate with said main base member, said first strap configured to secure said main base upon the shoulder of said user.

6. The personal bird perch of claim 5, wherein said main base member has formed therein strap cuts for allowing the passage of said first strap therethrough, said strap cuts forming forward and/or rear interface loops.

7. The personal bird perch of claim 6, wherein there is further provided a second strap member configured to communicate with said main base member, said second strap member of sufficient length to pass under the arm of the user's shoulder opposite that shoulder supporting said personal bird perch.

8. The personal bird perch of claim 1, wherein said grid perch area is molded in said top face of said main base member.

9. A personal bird perch for supporting a bird upon the shoulder of the user, comprising:

a main base having a forward end, a rear end, a top face, a bottom face, and first and second side edges, said main base having a generally radially configured bottom face;

a generally horizontally disposed catch basin at or near the rear end of said main base, said catch basin situated above the back of the user;

a perch grid situated on said top face of said main base, said perch grid comprising a frictional surface juxtaposed between the forward end of the main base and the catch basin.

* * * * *